Oct. 12, 1965 W. MOELTZNER 3,210,786
MACHINES FOR CHAMFERING ELEMENTS SUCH AS SCREWS AND BOLTS
Filed April 16, 1963 3 Sheets-Sheet 1

Inventor:
WILHELM MOELTZNER
By: McGlew and Toren
Attorneys

Oct. 12, 1965  W. MOELTZNER  3,210,786
MACHINES FOR CHAMFERING ELEMENTS SUCH AS SCREWS AND BOLTS
Filed April 16, 1963  3 Sheets-Sheet 2

Inventor:
WILHELM MOELTZNER
By: McGlew and Toren
Attorneys

Oct. 12, 1965  W. MOELTZNER  3,210,786
MACHINES FOR CHAMFERING ELEMENTS SUCH AS SCREWS AND BOLTS
Filed April 16, 1963  3 Sheets-Sheet 3

Inventor:
WILHELM MOELTZNER
By: McGlew and Toren
Attorneys

United States Patent Office 3,210,786
Patented Oct. 12, 1965

3,210,786
MACHINES FOR CHAMFERING ELEMENTS
SUCH AS SCREWS AND BOLTS
Wilhelm Moeltzner, Berlin-Grunewald, Germany, assignor to Firma Peltzer & Ehlers Maschinenfabrik, Krefeld, Germany
Filed Apr. 16, 1963, Ser. No. 273,387
Claims priority, application Germany, June 12, 1962, M 53,178
20 Claims. (Cl. 10—21)

This invention relates in general to metal part forming machines, and in particular to a new and useful machine for chamfering of screw bolts or the like which includes a rotary table with means thereon for holding screw bolts and rotating them as they are in an operative position past a profile cutter.

Chamfering arrangements are known wherein the cutting tool is mounted in an eccentric manner relative to the rotary table. With a construction of this nature, due to the eccentricity of the work pieces relative to the tool as they are advanced by the table, they are imparted with a somewhat semi-circular path of feed movement relative to the cutting tool. Due to such eccentricity there occurs a certain inexactness in the trueness of the rotational path of the work piece at the chamfering or at the point where the work piece is being acted upon by the cutting tool. Such errors become particularly significant when the work pieces are to be cut to a relatively large or exact depth and where the eccentricity is relatively large. For the purpose of forming surfaces at the front or end sides of the bolts, not only the eccentric arrangement is used as previously mentioned, but the rotary table has been somewhat inclined or slanted whereby satisfactory positioning relative to the front or end is accomplished. However, such arrangement is not sufficient to eliminate large deformations at the front or end sides. Such large deformations are previously formed at the work piece blank by shearing and cold or hot forming.

Furthermore, it is disadvantageous that no plane surface is formed during the working at the front or end of the bolt. Further, due to the inclined position referred to, the trueness of rotation is negatively affected both at the front or end face and also at the chamfering.

In most prior art machines the output of the machines is limited due to the fact that the working path in which the tools are operative is only one half of the effective operating range of the machines.

In accordance with the invention there is provided a device for chamfering screw bolts and the like which has a high accuracy of rotation in the areas where the bolt is worked upon and enables cutting to a great depth with accuracy and at high output.

In accordance with the invention there is provided a rotary table which is arranged coaxially with a cutter. Receiving heads for the screw bolts are rotatably mounted on the rotary table and these rotary heads are rotated by gear means during the rotation of the table. The arrangement of the heads is such that they may be reciprocated relative to the cutter for advancing the respective screw bolts into operation with the cutter and moving the screw bolts out of operation with the cutter, and which is advantageously effected by cam control means. The work pieces to be chamfered such as screw bolts are imparted with a positive rotary motion via the receiving heads, and they are also imparted with a revolving motion around the cutting tool due to the rotary movement of the table which carries the receiving heads. The cutting tool, in turn, is rotationally driven relative to the table and each of the receiving heads with the work piece is imparted with its own controlled speed movement toward and away from the cutting tool.

In accordance with one embodiment of the invention, a rotary table is arranged for rotative movement directly above and concentrically with a rotatable cutter which includes both chamfering and end cutting surfaces. The table carries a plurality of receiving heads for the work pieces which reciprocate in the table under the control of a cylinder cam. A stationary gear is arranged to drive gearing on each receiving head to rotate the heads as they are being revolved by the rotating table.

In accordance with another embodiment of the invention, the receiving heads are held on a table which is arranged concentrically in respect to a rotatable cutter but with the heads arranged radially outwardly from the cutter but imparted with a rotatable movement about the axis of the work piece as well as being carried by the rotatable table. A feature of both these embodiments is that almost the complete circumference around the cutting tool is available for working operation. Since the work pieces may be operated on over a large portion of such circumference, the positioning may be performed slower and the rotary movement may be faster so that a higher output is obtained.

In the embodiment mentioned above, the receiving heads are made displaceable toward and away from the rotary cutter by means of rollers which act upon cam surfaces. The individual receiving heads are advantageously rotated about their own axes or the axes of the work pieces by a gear rim which is advantageously a stationary gear secured to a frame. In the case of the parallel feeding of the work pieces, that is where the table is mounted above the rotary cutter, the rotary table is advantageously provided with an opening of a size to accommodate a stationary gear which extends inwardly for engagement with gears on the receiving head which are carried within the rotary table. This arrangement has the advantage that no separate drive is necessary for the rotary movement of each of the receiving heads. A further feature is that since the gear projects into an annular recess defined in the periphery of the table, the interior teeth of the gear are always within the table in a protected location. The arrangement also insures that a minimum of space will be required.

In accordance with a further feature of the invention the receiving heads are slidable on a sleeve member which is held fast on the table. The receiving heads include shaft portions which reciprocate within the respective sleeves. The sleeve is biased upwardly by a compression spring but is held fast against rotation relative to the table. The sleeve, in turn, is provided with a counter holder or C-shaped extension which extends below the bottom portion of the head at the location where the bolt is received. The arrangement permits easy reciprocation of the receiving head in directions toward and away from the cutting tool. In addition the shaft of the receiving head is made hollow at the lower portion and carries an ejector pin which is activated by a compression spring which is compressed by the action of a roller and plunger follower controlled by a stationary cylinder cam.

A further feature of the construction is that a common stationary spindle assembly carries the rotary cutter and the rotary table but the spindle assembly is advantageously provided with two separable spindle portions. The two portions are interconnected by a screw which may be easily removed for disassembly of the parts when desired. The table holding the rotary cutting tool may also be displaced relatively to the shaft portion in an axial manner. The table is mounted on its shaft portion for axial adjustment in a similar manner and is advantageously keyed to the shaft by a resilient or spring-like member.

In the case of the arrangement of the table so that the work piece is held radially outwardly from the cutting tool, there is advantageously provided a guided block or guide prism which consists of a jaw which is secured on the table and of another jaw which is movable relative to the first jaw by spring means. The jaws define an opening for receiving the screw bolt work piece for purposes of accurately aligning and clamping the screw bolt in relation to the central cutting tool. In addition, between the guide prism and the receiving head there is advantageously provided a radially movable bearing member.

A still further embodiment of the invention includes receiving head mounting bodies which are rockably mounted on the table. In these rockable bodies which contain the receiving heads there are arranged chucks which, in turn, are arranged in a gear body. The chucks are closed by the pressure of a spring. The gearing of the gear wheel body meshes with a gear which is arranged concentrically to the tilting axis of the locking body. The gear is driven by a bevel wheel and pinion pair from a ring gear which is secured below the table. In addition, a roll is mounted on the tilting body to engage a positioning cam which is mounted above the tilting body.

Accordingly, it is an object of this invention to provide an improved device for chamfering work pieces such as screw bolts.

A further object of the invention is to provide an arrangement for chamfering of screw bolts and the like which includes a rotary table carrying individual heads for receiving the screw bolts, which heads, in turn, are individually rotated preferably by a stationary gear arranged alongside the rotary table, the table being coaxially arranged relative to a cutter, and the receiving heads being mounted on the table for movement toward and away from the cutter and for rotatable movement in their mounting.

A further object of the invention is to provide a work piece cutting device in which the work piece is held by a table arranged to rotate about a central rotatable cutter and wherein the work piece is held on the table by a head which is individually rotatable about an axis substantially coinciding with the axis of the work piece.

A further object of the invention is to provide a cutting machine, particularly a machine for chamfering and finishing screw bolts and the like, comprising a rotary table arranged for rotation concentrically with a central rotary cutter and carrying a plurality of rotatable work piece receiving heads which are individually rotatable in the table arranged above the cutter, wherein each of the rotatable heads is rotated by a stationary gear which projects into the rotary table and wherein the receiving heads are reciprocable during their revolution by said table for advancing the work piece toward and away from the cutter.

A further object of the invention is to provide a cutting machine and the like, particularly for chamfering and finishing screw bolts wherein a table is provided for rotatably carrying a plurality of receiving heads for work pieces, the table being located radially outwardly from a central cutting tool but arranged for concentric rotation in respect thereto, and the receiving heads being individually rotatable and displaceable radially for the purpose of moving the work pieces toward and away from engagement with the cutting tool.

A further object of the invention is to provide a cutting machine for chamfering and end finishing screw bolts and the like which includes a central rotatable cutter with a pivotal body arranged on a table which is concentrically rotatable in respect to said cutter, the pivotal body rotatably holding receiving heads which are individually rotatable on the table, the body being pivotally displaceable toward and away from the cutting tool.

A further object of the invention is to provide a cutting machine for chamfering and end finishing screw bolts and the like which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
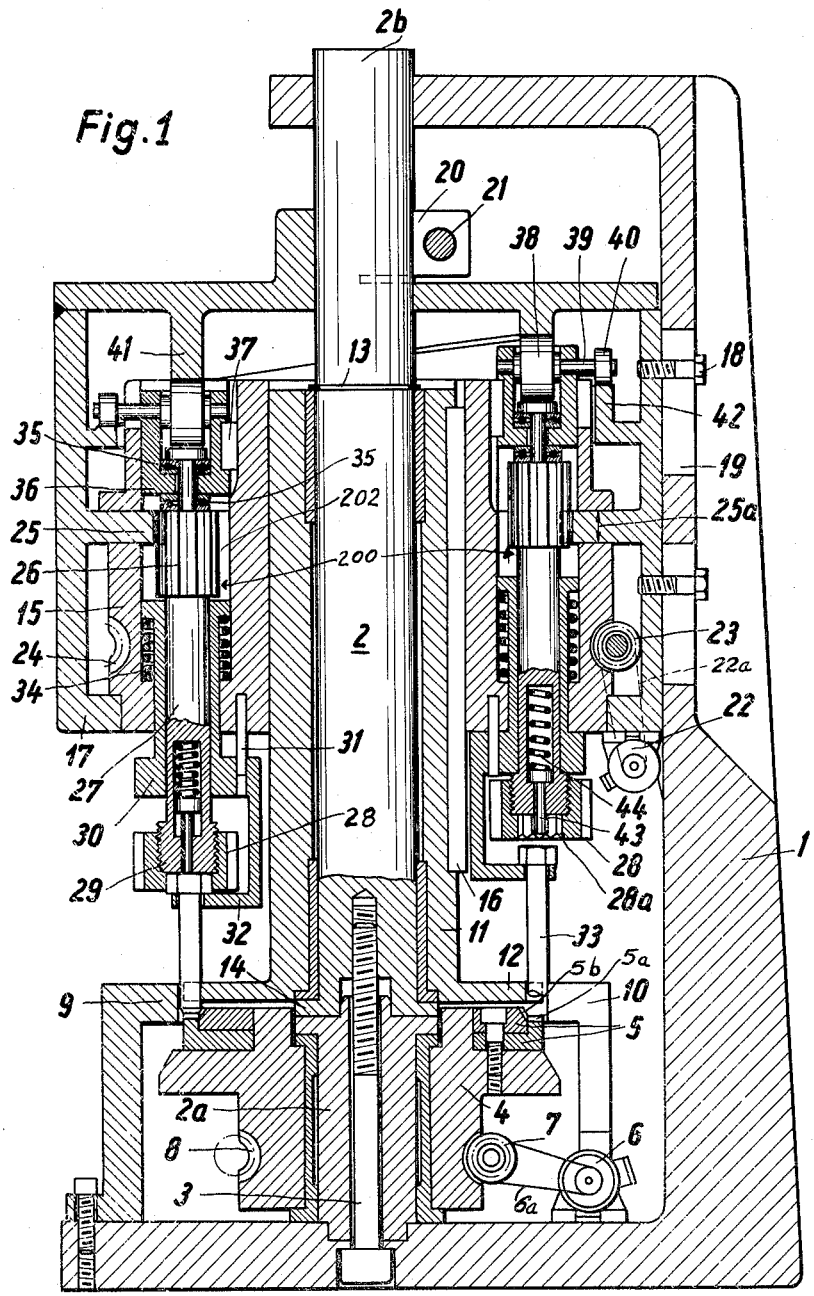
FIG. 1 is a transverse section of a chamfering device constructed in accordance with the invention.

Referring to the drawings in particular, the invention embodied therein as indicated in FIG. 1 comprises a generally C-shaped sectioned main frame 1 which non-rotatably supports a spindle assembly generally designated 2. The spindle comprises a lower portion 2a and a separable upper portion 2b which are secured together by means of a threaded bolt member 3.

In accordance with the invention, the tool holder or table 4 which is carried on the spindle portion 2a carries a profile cutter generally designated 5 which includes a horizontal cutter portion 5a and an oblique cutter portion 5b. The tool holder 4 is rotatable around the stationary shaft portion 2a and is driven from a motor 6 which rotates a worm 7 by means of a belt 6a. The worm 7 drives a worm gear 8 formed in the lower portion of the tool holder 4. A stationary table or counter holder 9 is mounted on the frame 1 and extends concentrically around the cutter, except in the cutout portion or area indicated at 10. The opening 10 is arranged at the location where work pieces 33 are supplied to the machine by means of a feed device (not shown). The work pieces are also discharged at the location of the cutout area 10.

The upper spindle portion 2b rotatably carries a long hub 11 formed with a follower flange or disc 12, and hub 11 is secured against axial displacement by means of a securing ring 13 at the upper end and a collar formation 14 at the lower end.

A rotatable table 15 is carried around the hub 11 and is secured against relative rotation in respect to the hub by means of a key 16 which permits axial relative movement of the table in respect to the hub. A casing 17 surrounds the table and is secured to the frame 1 at a selected height. The height adjustment may be effected by screws 18 which extend through slots 19 and are threaded into the stationary casing 17. The top of the casing carries a clamping ring 20 which is secured to the spindle portion 2b by means of screw means 21. The table 15 is carried within the casing so as to be axially non-displaceable. The drive of the table to effect rotation thereof around the spindle 2 is effected by means of a motor 22 driving a worm 23 by means of a belt 22a. The worm 23, in turn, rotates worm gearing 24 defined on the table 15.

In accordance with a feature of the invention, a gear 25 is defined on the casing 17 and extends inwardly through an annular groove 25a which is defined in the table 15. Thus, the gear teeth portion is always situated within the enclosed table 15. The table carries a plurality of work piece receiving head assemblies generally designated 200. Each assembly 200 includes a shaft portion 27 which carries a pinion 26 which is engaged with the gearing of gear 25. The axial length of the teeth on the pinion 26 is such as to permit axial shifting movement of the pinion in respect to the stationary gear 25.

Each receiving head assembly 200 also includes a receiving head or holding element 28 which is carried at the lower end of the shaft portion 27 and includes an interior hexagonal receiving portion for receiving the hexagonal head of a screw bolt. The receiving head 28 is threaded onto the threaded member or widened portion 29 formed at the end of the shaft 27. The receiving head 28 is exchangeable and a head is chosen in accordance with the size of the head of the work piece which is to be operated upon. The shaft 27 is slidable in a sleeve member 30 having opposite ends which are flanged with one end riding in a bore 202 and an outer end arranged exteriorly of the table 15. Each sleeve member 30 is biased upwardly by means of a compression spring 34 engaging its inner flanged end. The outer end is provided with a C-shaped extension which includes a counter holder portion 32 which has a slotted end which is adapted to engage under the head of the work piece. The left-hand portion of the drawing indicates a sleeve 30 in a downward position with the compression spring 34 compressed, whereas the right-hand portion of the drawing indicates a sleeve 30 in an upward position. Guiding of each sleeve 30 is accomplished by means of a pin 31 which rides in a bore of the exterior flange portion of the sleeve.

The upper end of the shaft 27 is journalled in vertically spaced bearings 35, 35 which are carried by a forked bolt 36. The forked bolt 36 is axially movable in the table 15 but is secured against rotation in respect thereto by a key 37. An intermediate roller follower 38 is rotatably journalled in the forked bolt 36 at a location to overlie an upper extension of the shaft 27 in a position to engage the cylinder cam 41 defined as a downward extension of a top portion of the casing 17. A second roller 40 provided on an extending shaft 39 of the roller 38 upwardly extending cylinder cam portion 42 defined in the casing 17 and acts on the roller 40 to cause a return movement of the receiving head into its starting portion which is assumed at the instant of the ejection of the finished work piece and the feeding of a new work piece.

In order to make sure that the work piece is safely ejected from the receiving head 28, an ejector pin 43 is provided which is actuated by compression spring 44. The force on this compression spring is increased during the downward movement of the shaft 27 after the work piece has first been pressed against the cutting tool, and during upward movement of the shaft 27 the work piece or screw bolt 33 is automatically ejected due to the downward movement of the pin 43 by the spring 44.

Figure 2:
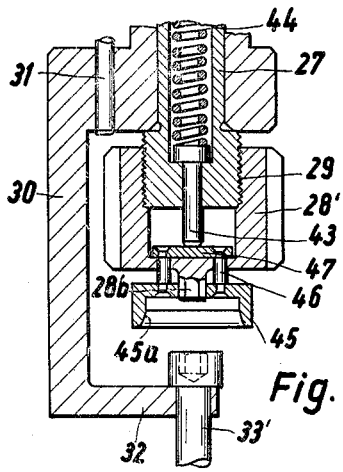
FIG. 2 is an enlarged section of another embodiment of the receiving head for the device of FIG. 1.
Figure 5:
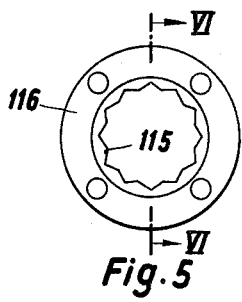
FIG. 5 is an elevational view of the receiving head of the embodiment of FIG. 4 taken in the direction of the arrow V.
Figure 6:
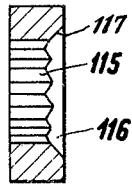
FIG. 6 is a section taken on the line VI—VI of FIG. 5.
Figure 7:
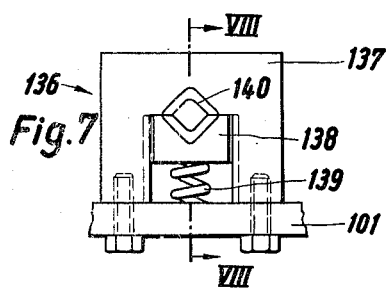
FIG. 7 is a partial end elevation indicating the guide prism.
Figure 8:
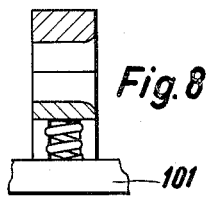
FIG. 8 is a section taken on the line VIII—VIII of FIG. 7.

In FIG. 2 an alternate embodiment of the receiving head 28' is indicated. This receiving head 28' is adapted to seat a screw bolt which has an interior hexagon formed on its head portion. The receiving head 28' has a corresponding projecting hexagon 28b. The ejector pin 43 does not act as in the previously described embodiment directly on the screw bolt, but indirectly via a ring 45 which is mounted concentrically to the hexagon 28b by means of four pins 46 of a cylindrical disc 47. The disc is engaged by the ejector pin 43. The interior bore 45a of the ring engages around the cylindrical head of the screw bolt and the hexagonal head 28b engages into the recessed hexagonal portion of the screw bolt 33'. In this manner the centering of the screw bolt is obtained. The counter holder 32, under the influence of the spring 34 (shown in FIG. 1), urges the screw bolt 33' upwardly into engagement with the hexagonal head 28b.

Due to the rotary drive of the table 15, all of the receiving heads 200 are imparted with a rotation about their axes which substantially coincide with the respective axes of the work pieces held thereby. This rotation is produced by the meshing engagement of the pinions 26 with the internal gear 25 formed on the casing 17. During one rotation of the table the receiving heads are advanced against the cutter 5 by means of the positioning cam 41. In doing so, the bolts are chamfered and the ends are formed. After this working step the receiving heads are again retracted into the starting position as shown on the right-hand portion of FIG. 1. The retracting movement is accomplished by means of the cam 42 acting on the roller 40. In moving to the retracted position, the sleeve 30 of the counter holder 32 will move first, and the receiving head 28 must still be retracted in order to release the screw bolts.

In FIGS. 3 to 8 an embodiment is shown with a radial arrangement of the receiving heads in relation to the central cutter. A work piece carrier or table 101 is arranged to surround central disc cutters or millers 102 in a concentric manner, as in the other embodiment. A drive motor 104 is provided for the cutter 102 and it drives a worm 108 through a belt 104a. The worm 108 engages a worm pinion 109 which is mounted on a shaft 107 which carries the cutter 102. A drive motor 105 is provided for the table and it drives a worm 105a through belting 105b to rotate the worm pinion 111 carried on a common shaft with the driving pinion 112 which meshes with a gear rim 113 formed integral with a work piece carrier or table 101. Cutting of the work pieces 114 may be effected in a synchronized manner or in an opposing manner. The cutter includes vertically arranged cutting teeth 102a at the top and oblique cutting teeth 102b therebeneath, and the vertical cutting teeth form the front edge of the work piece 114, whereas the oblique cutting teeth form the chamfering.

A plurality of receiving heads 115 are arranged in angularly spaced relation on the work piece carrier 101 and radially aligned in respect to the cutter axis 107. Each head 115 has an annular key profile 116 corresponding to the size of the screw heads. The profile has a conical insert opening 117 (see FIGS. 5 and 6). The receiving head 116 is secured at the end of a carrier bolt 118 which is rotatable along a gear member 120 but is axially displaceable therein through the sliding key connection 119. The hub gear 120 is rotatably mounted in the block 122 and includes a bevel gear portion 121 which meshes with a bevel gear 123. The bevel gear 123 is carried on a common shaft with a gear 124 which engages the stationary integral ring gear 125 which is screwed to the frame 103.

The work pieces are fed in a radial direction toward the axis of the shaft 107 carrying the cutter 102 by means of a positioning cam 126 which is secured on the frame 103 and actuates a roller lever 127. The roller lever 127 is mounted with its pivot 128 in the work piece carrier 101 and is indicated best in FIG. 3. The upper end of the pivot 128 carries a forked lever 129 having a slot 130 which receives a pin 131 of a follower ring 132. The follower ring 132 runs in an annular groove of the bolts 118.

A bearing prism 133 having a return nose 134 is arranged in front of the receiving head 115 in a position to support the work piece bolt 114. The prism is movable in slide guides 135 in a direction radial to the tool axis for adjustment purposes.

A divided guide prism 136 (FIGS. 3, 4, 7 and 8) is arranged at the inner circumference of the work piece carrier 101, the guide prism 136 comprising an outer member 137 of substantially U-shaped configuration which is bolted to the table 101. A central lower prism half 138 is biased upwardly by means of a compression spring 139 against the upper prism half and is guided in the legs of the upper portion 137. An insert opening is defined between the halves 137 and 138 and has a flared entry portion 140.

Figure 4:
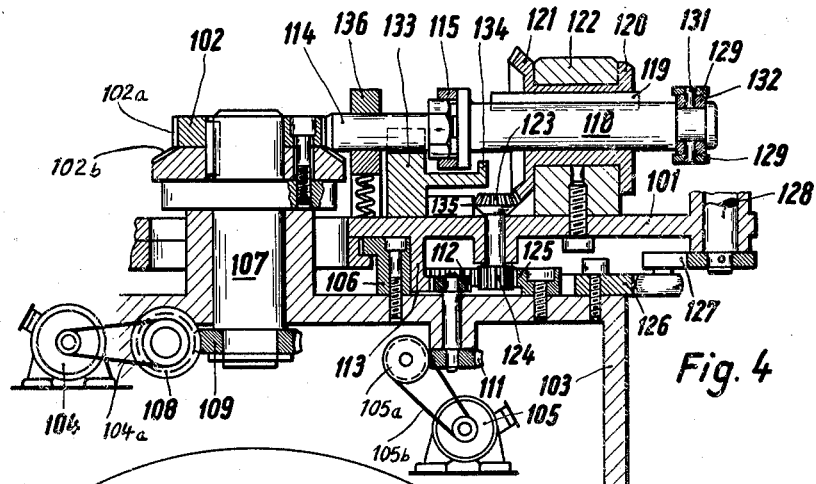
FIG. 4 is a section taken on the line IV—IV of FIG. 3.
Figure 3:
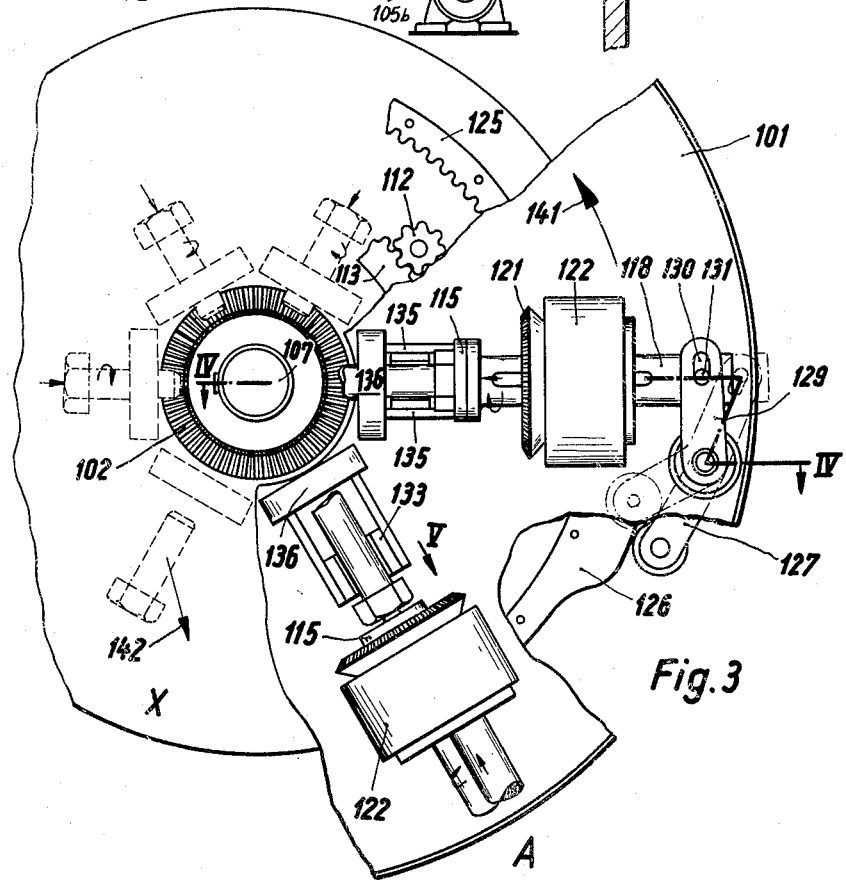
FIG. 3 is a partial top plan view of another embodiment of chamfering device.

The work pieces 114, by automatic feed means (not shown), are fed in at the station A, as indicated in FIG. 3, and are positioned on the bearing prism 133. During the rotary movement of the work piece carrier in the direction of the arrow 141 in FIG. 3, each receiving head 115 is advanced and presses the screw end into the guide prism 136 between the parts 138 and 137. The receiving head 115 also receives the polygonal screw head within the profile 116 and imparts it with a rotary movement. During the advance movement the bearing prism 133 is displaced inwardly, as indicated in FIG. 4. During the return movement of the carrier bolt 118 the receiving head 115 releases the screw head, since the shaft of the work piece is held by the spring 139 biasing the prism guide 136 to clamp the work piece shaft. During the continuous return movement of the bolt 118, the return nose 134 of prism 133 is engaged by profile 116 and draws the work piece out of the prism guide 136 and returns the bearing prism 133 into the original position. This return movement takes place at the station X in FIG. 3, which is in front of the position at the station A and the work piece is ejected at this station, as indicated by the arrow 142.

Figure 9:
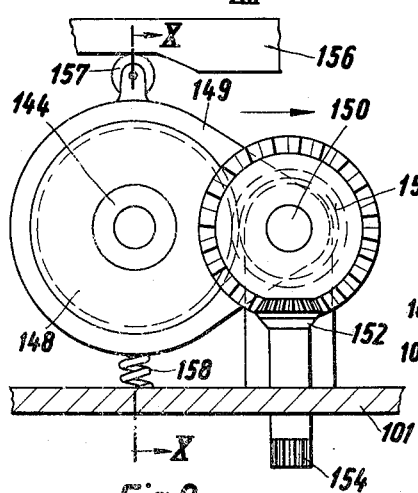
FIG. 9 is a partial sectional and partial end elevational view of another embodiment of chamfering device.
Figure 10:
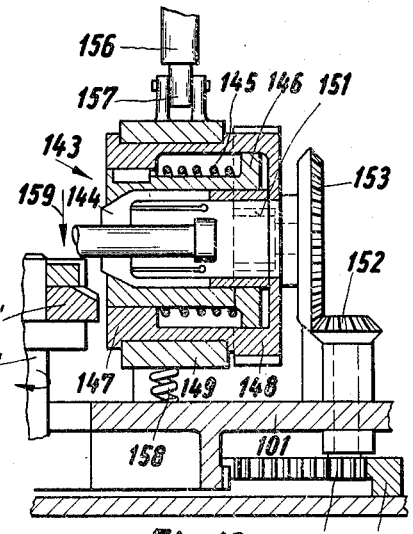
FIG. 10 is a section taken on the line X—X of FIG. 9.

With the type of work pieces where there is no possibility to chuck the work pieces at the head end, it is necessary to mount the work piece at the cylindrical shaft as, for example, in the case of screws having rounded heads. In such an instance the chucking or mounting may be done in accordance with the embodiments illustrated in FIGS. 9 and 10 by a head generally designated 143 which contains a controllable chucking tongue 144 of known construction and which can be closed under pressure. The closing pressure is carried out by means of a spring 145 which presses a sliding sleeve 146 against the cone of the clamping tongue. The opening is effected by a control movement against the spring pressure by means of a cam (not shown). This cam actuates a rod system connected with the sleeve 146. The sleeve 146 is guided in a bushing 147 which includes a gear portion 148. The bushing 147 is rotatably mountable in a body 149. The body 149 is rockable about the axis 150 of the driving pinion 151 which is in meshing engagement with the gear 148. The rotary drive of the driving pinion 151 is through bevel gears 152 and 153 which are identical with the bevel gears 121 and 23 of the embodiment of FIGS. 3 and 4. The gear pinion 154 corresponds to the gear pinion 124 while the ring gear 155 corresponds to the ring gear 125.

A positioning cam 156 is placed on edge and causes a tilting movement of the receiving head 143 through the roller 157 which is mounted on the tilting body 147 and is maintained in bearing contact with the positioning cam 156 by means of the spring 158 which supports the tilting body. The tilting movement causes the positioning of the work piece in respect to the cutting tool 102′ as indicated by the arrow 159, that is, in a direction substantially axially in respect to the axis 107′ of the cutter 102′.

The embodiments of the invention in which an exclusive property or privilege is claimed are defined as follows:

1. An arrangement for chamfering of screw bolts and the like, including a rotary table having a work piece receiving head rotatably and bodily shiftably supported thereon, a rotary profile cutter, said work piece receiving head being shiftable with a work piece engaged therein into and out of a working position in respect to said profile cutter, characterized in that said table is coaxially arranged relative to said cutter and that said work piece receiving head carries a gear wheel, and including a stationary gear in meshing engagement with the gear wheel of said work piece receiving head and arranged to rotate said receiving head during rotation of said table and independent driving means for rotating said table and said cuuter independently of each other about a common fixed axis.

2. An arrangement according to claim 1, wherein said receiving head is arranged axially parallel to the axis of said cutter and wherein said work piece receiving head is guided vertically for axially displaceable movement and includes a gear wheel having a length corresponding the length of the displacement path of said head so that the gear wheel is always in engagement with such stationary gear.

3. An arrangement according to claim 1, including cam means for shifting said rotatable work piece receiving heads toward and away from said cutter during rotation of said work table.

4. An arrangement according to claim 1, including a casing, a frame rigidly supporting said casing, said casing surrounding the work table, said work table having an annular groove, said casing having a gear which projects through said annular groove for engagement with the pinion of said work piece receiving head.

5. An arrangement according to claim 3, including a sleeve vertically slidable in said work piece, supporting table, said work piece receiving head being reciprocable in said sleeve, said work piece receiving head having a portion for receiving a head of a work piece therein, said sleeve having an extending portion adapted to engage under the head of the work piece.

6. An arrangement according to claim 5, including an ejector carried by said work piece receiving head which is vertically reciprocable within said head, said head including a lower portion adapted to engage around the head of a work piece, said ejector being reciprocable within said portion for ejecting the work piece.

7. A machine for forming work pieces, particularly for chamfering screw bolts and the like, comprising a rotary cutting tool, a rotary work table, common fixed axis means mounting said rotary cutting tool and said rotary work table concentrically in respect to each other and for rotation independently of each other, a rotary work piece holding head, means rotatably supporting said rotary work piece holding head on said work table at a location spaced from the center of rotation of said work table and providing for displacement of said work piece holding head relative to said work table, control means for moving said work piece holding head in directions toward and away from said cutter, gear means operable by rotation of said work table to rotate said work piece holding head during rotation of said work table, and independent driving means for said work table and said tool.

8. A machine according to claim 7, wherein said gear means includes a stationary gear, said work piece holding head including a gear thereon in meshing engagement with said stationary gear which is rotatable upon rotation of said work piece.

9. A machine according to claim 7, wherein said work piece holding head is arranged axially parallel to the axis of rotation of said cutter and is displaceable in vertical directions toward and away from said cutter.

10. A machine according to claim 7, wherein said work piece holding head is arranged with its axis substantially radial to the center of rotation of said cutting tool and is displaceable in radial directions toward and away from said cutter.

11. A machine according to claim 7, including means pivotally mounting said work piece holding head on said work table, said means being pivotal to shift said work piece holding head in respect to said rotary cutter.

12. A machine according to claim 7, in which said common axis means for said rotary work table and said rotary cutter comprises a common spindle member having separable upper and lower portions.

13. A machine according to claim 7, said common axis means including a common spindle member, a hub member rotatable about said spindle member, said table being connected to said hub member for rotation therewith but being axially adjustable therealong.

14. A machine according to claim 7, wherein said table is mounted in a position extending radially outwardly from said cutter, said means rotatably supporting said rotary work piece receiving head including a hubbed gear member rotatable about an axis extending substantially radial in respect to the axis of rotation of said cutter, said work piece receiving head being slidable in said hubbed gear member.

15. A machine according to claim 14, wherein said gear means includes a stationary gear disposed below said work table, and gear means connected between said stationary gear means and a bevel gear forming part of said hubbed gear member for rotating said hubbed gear member with said work piece receiving member.

16. A machine according to claim 14, including a guide prism mounted on said table between said work piece receiving head and said cutter, said guide prism including a stationary U-shaped jaw forming an upper jaw element and a lower element biased upwardly against said upper jaw element, said jaw elements having openings defined therebetween for insertion of a work piece.

17. A machine according to claim 16, including a U-shaped bearing member for supporting said work piece disposed between said prism and said work piece receiving head.

18. A machine according to claim 14, including a member pivotally supported on said work table and carrying said head, said head having clamping means for clamping a work piece, said control means including a cam member for pivoting said pivotally mounted body for moving said work piece toward and away from said cutting tool.

19. A machine for forming work pieces, particularly the chamfering of screw bolts, comprising a central spindle member, a rotary cutter rotatable around said spindle member, a table located above said cutter and rotatable about said spindle member independently of said rotary cutter, said table having an annular circumferential opening, a stationary internal ring gear extending into the annular opening of said table, a work piece holding head, means mounting said work piece holding head in said table for vertical reciprocation, said holding head having a driven gear thereon in meshing engagement with said stationary ring gear whereupon by rotation of said work table said work piece holding head is rotated, stationary cylinder cam means, and roller follower means carried by said head and arranged to engage said cam means and reciprocate said head upwardly and downwardly towards and away from said cutter during rotation of said table.

20. A machine according to claim 19, wherein said means mounting said work piece holding head includes a sleeve vertically reciprocably mounted in said table, said head being reciprocable within said sleeve, means biasing said sleeve upwardly so that its uppermost edge is urged toward the lowermost edge of said driven gear, said sleeve including a lower portion extending below the lower portion of said head in a position for supporting a work piece beneath the head portion of the work piece, said work piece receiving head including a holding member for engaging over the top of said work piece, an ejector member slidable in said work piece receiving head into and out of said holding member, and spring means for urging said ejector to an ejection position, said sleeve extension being engageable with the bottom of said table during upward movement of said work piece receiving head, whereupon further upward movement effects actuation of said ejector and release of the work piece.

References Cited by the Examiner
UNITED STATES PATENTS

| | | | |
|---|---|---|---|
| 314,935 | 3/85 | Harvey et al. | |
| 730,882 | 6/03 | Davis. | |
| 1,832,190 | 11/31 | Doane | 51—108 |
| 2,802,224 | 8/57 | Hillman. | |
| 3,056,981 | 10/62 | Byam | 10—21 |

FOREIGN PATENTS 327,311  3/03  France.

ANDREW R. JUHASZ, *Primary Examiner.*